(12) United States Patent
Park

(10) Patent No.: US 10,962,067 B2
(45) Date of Patent: Mar. 30, 2021

(54) CALIPER COVER

(71) Applicant: Jin Su Park, Seongnam-si (KR)

(72) Inventor: Jin Su Park, Seongnam-si (KR)

( * ) Notice: Subject to any disclaimer, the term of this patent is extended or adjusted under 35 U.S.C. 154(b) by 0 days.

(21) Appl. No.: 16/377,508

(22) Filed: Apr. 8, 2019

(65) Prior Publication Data

US 2019/0338815 A1 Nov. 7, 2019

(30) Foreign Application Priority Data

May 2, 2018 (KR) .......................... 10-2018-0050616

(51) Int. Cl.
*F16D 65/847* (2006.01)
*F16D 65/00* (2006.01)
*F16D 55/22* (2006.01)
*F16D 55/00* (2006.01)

(52) U.S. Cl.
CPC ......... *F16D 65/0081* (2013.01); *F16D 55/22* (2013.01); *F16D 2055/0037* (2013.01)

(58) Field of Classification Search
CPC .... F16D 55/22; F16D 55/225; F16D 65/0031; F16D 65/0081; F16D 65/0087; F16D 65/847; B32B 3/06

USPC ................. 188/73.1, 73.31, 218 A; D12/180
See application file for complete search history.

(56) References Cited

U.S. PATENT DOCUMENTS

| | | | |
|---|---|---|---|
| D476,275 S * | 6/2003 | Winkler | .................. F16D 55/22 |
| | | | D12/180 |
| 9,046,143 B2 | 6/2015 | Barland | |
| 9,278,498 B2 | 3/2016 | Collura | |
| 2018/0010656 A1* | 1/2018 | Barland | ............. F16D 65/0081 |
| 2018/0080512 A1 | 3/2018 | Barland | |
| 2018/0231076 A1* | 8/2018 | Choi | .................. F16D 65/0006 |
| 2020/0132138 A1* | 4/2020 | Barland | ............... F16D 55/225 |

FOREIGN PATENT DOCUMENTS

| | | |
|---|---|---|
| JP | 3078795 | 7/2001 |
| JP | 5715932 | 5/2015 |
| KR | 10-2017-0069646 | 6/2017 |
| KR | 10-2017-0137318 | 12/2017 |

* cited by examiner

*Primary Examiner* — Christopher P Schwartz
(74) *Attorney, Agent, or Firm* — Lex IP Meister, PLLC

(57) ABSTRACT

The present invention relates to a caliper cover, and more particularly, to a caliper cover that protects a brake caliper and is firmly fixed to the brake caliper.

7 Claims, 5 Drawing Sheets

CALIPER COVER

BACKGROUND OF THE INVENTION

(a) Field of the Invention

The present invention relates to a caliper cover, and more particularly, to a caliper cover that protects a brake caliper and is firmly fixed to the brake caliper to ensure stability, and particularly, to discharge heat generated during running.

(b) Description of the Related Art

A brake caliper is a device that brakes a wheel by bringing a vehicle brake pad into contact with a brake disk.

As such, the brake caliper is a part responsible for braking a vehicle, so that it is exposed to a harsh environment. For example, the brake caliper may be subjected to shocks caused by collision with foreign objects on the road surface, impacts caused by vehicle braking, and heat generated by vehicle braking.

A caliper cover is required in order to protect the brake caliper against such environments.

Conventionally, the caliper cover is coupled thereto by a bonding method, e.g., by applying a bonding material such as silicone to a surface of the brake caliper and attaching the caliper cover to a portion where the bonding material is applied.

However, in this case, the caliper cover may be detached from the brake caliper due to melting of the bonding material by heat generated during braking, and an accident occurs when the detached caliper cover is sucked into the disk during driving.

PRIOR ART

Patent Document

Korean Patent Laid-Open Publication No. 10-2017-0069646 (published on Jun. 21, 2017)

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, a technical object of the present invention, which is contrived to solve the aforementioned problem, provides a caliper cover capable of effectively protecting a brake caliper.

In addition, it provides a caliper cover that is rigidly fixed to a brake caliper to prevent the caliper cover from being separated from the brake caliper due to vibration, impact, or heat generated during braking.

An exemplary embodiment of the present invention provides a caliper cover that is coupled to a brake caliper to protect the brake caliper, including: a cover plate configured to cover a front portion of the brake caliper; a pair of bridges configured to extend from the cover plate toward a rear portion of the brake caliper; and a fastening portion formed to be bent from an end of each of the pair of bridges and to be fastened to the rear portion of the brake caliper.

The pair of bridges may be welded to the cover plate.

The fastening portion may be fastened to the brake caliper by screwing.

The fastening portion may be formed with a fastening hole corresponding to a coupling groove formed in the rear portion of the brake caliper, and a fixing bolt may be screwed into the coupling groove through the fastening hole, to fasten the fastening portion to the brake caliper.

The caliper cover may further include a fixing portion formed to be bent from a side surface of each of the pair of the bridges, for covering the side surface of the brake caliper and fixing the bridge to the brake caliper.

A fixing groove may be formed in an upper portion of the brake caliper, and a fixing protrusion may be formed at an upper side of the cover plate to correspond to the fixing groove.

The caliper cover may further include a support configured to support a lower portion of the brake caliper at a lower side of the cover plate.

The cover plate, the bridge, and the fastening portion may be formed of an aluminum material.

A concave-convex portion for dissipating heat may be formed on an outer surface of the cover plate.

According to the exemplary embodiments of the present invention, the caliper cover may be rigidly fixed to the brake caliper, thereby preventing the caliper cover from being separated from the brake caliper due to vibration, impact, or heat generated during braking.

The effects of the present invention are not limited to the effects mentioned above, and other effects not mentioned can be clearly understood by those skilled in the art from the description of the claims.

DETAILED DESCRIPTION OF THE EMBODIMENTS

Figure 1:
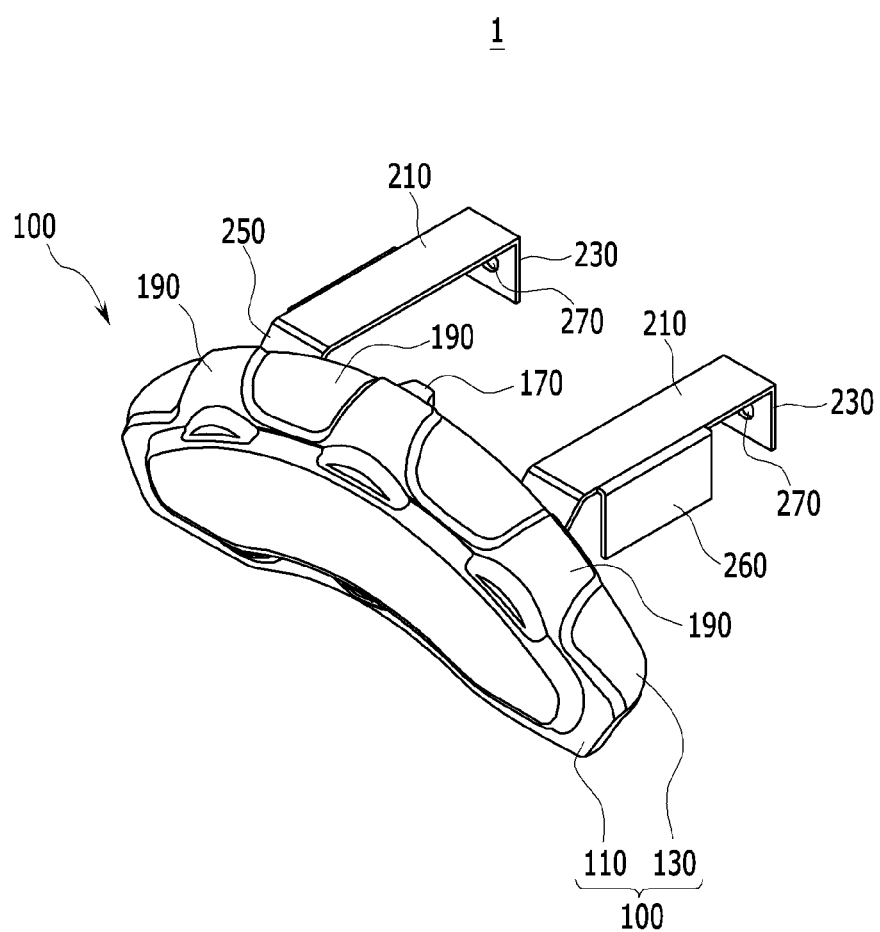
FIG. 1 illustrates a perspective view of a caliper cover according to an exemplary embodiment of the present invention.

Since the present invention may be variously modified and have various forms, exemplary embodiments will be illustrated and described in detail in the following. This, however, by no means restricts the invention to the specific embodiments, and it is to be understood as embracing all included in the spirit and scope of the present invention changes, equivalents, and substitutes. Like reference numerals are used for like elements in describing each drawing. Terms such as first, second, and the like will be used only to describe various components, and are not to be interpreted as limiting these components.

The terms are only used to differentiate one component from other components. It is also to be understood that the terminology used herein is only for the purpose of describing particular embodiments, and is not intended to be limiting of the invention. Singular forms are to include plural forms unless the context clearly indicates otherwise.

It will be further understood that terms "comprises/includes" or "is composed of" used in the present specification specify the presence of stated features, numerals, steps, operations, components, parts, or a combination thereof, but do not preclude the presence or addition of one or more other features, numerals, steps, operations, components, parts, or a combination thereof.

All terms used herein including technical or scientific terms have the same meanings as those which are generally understood by those skilled in the technical field to which the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present invention will be described in more detail with reference to the drawings.

Figure 2:
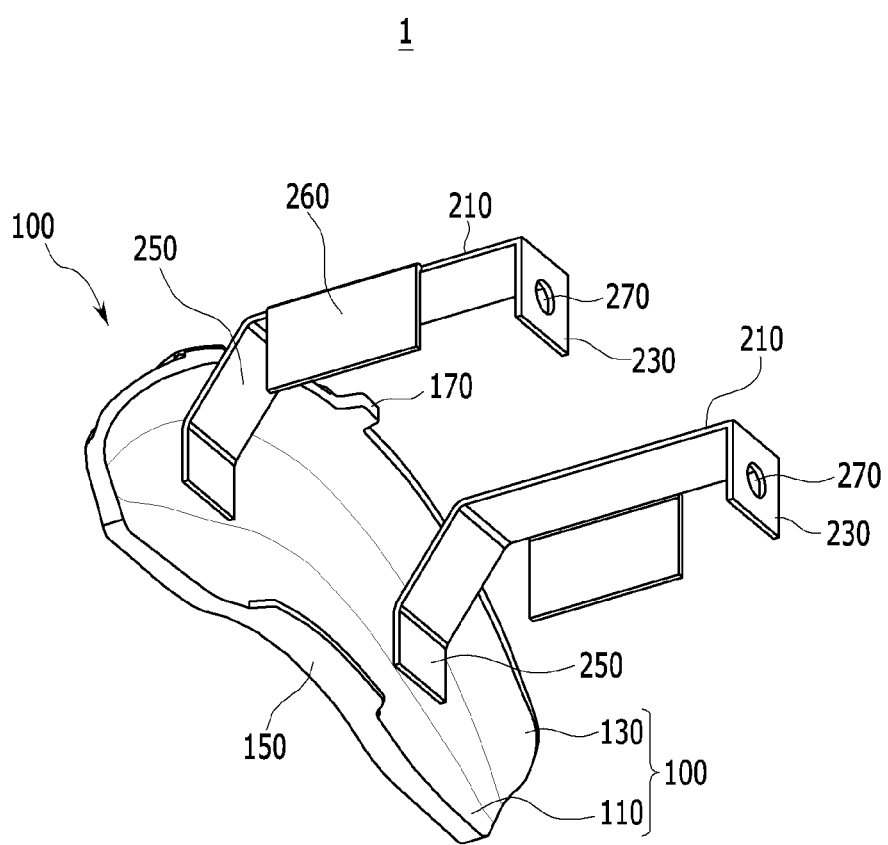
FIG. 2 and FIG. 3 illustrate reference views for describing a caliper cover according to an exemplary embodiment of the present invention.
Figure 3:
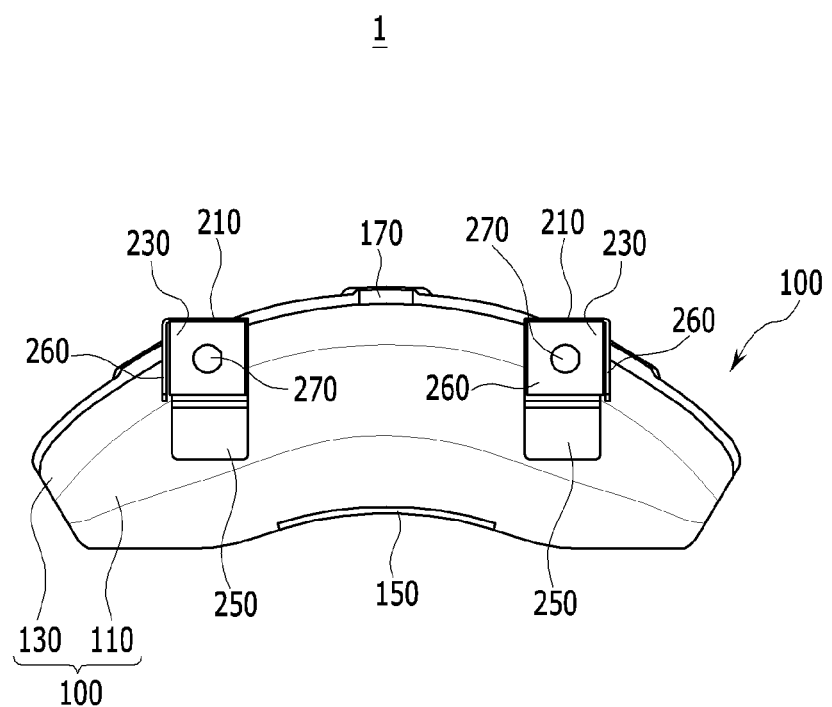
Figure 4:
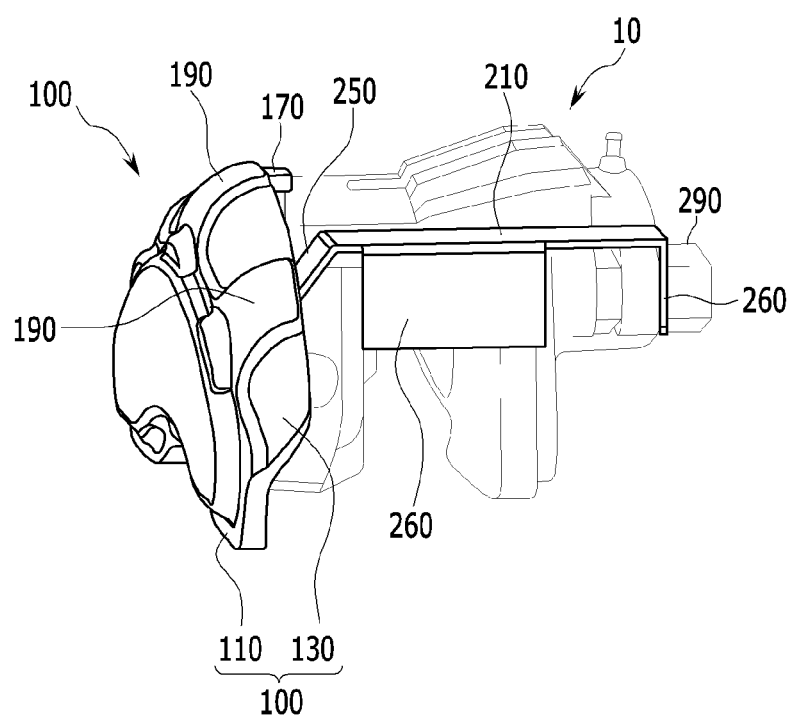
FIG. 4 and FIG. 5 illustrate reference views showing a state in which a caliper cover is coupled to a brake caliper according to an exemplary embodiment of the present invention.
Figure 5:
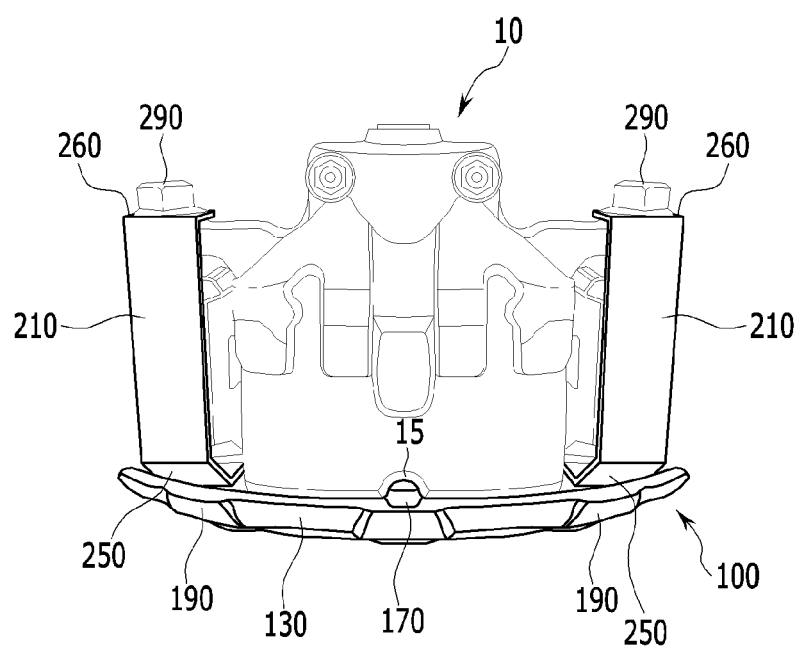

FIG. 1 illustrates a perspective view of the caliper cover 1 according to an exemplary embodiment of the present invention, and FIG. 2 and FIG. 3 illustrate reference views for describing the caliper cover 1 according to an exemplary embodiment of the present invention. FIG. 4 and FIG. 5 illustrate reference views showing a state in which the caliper cover 1 is coupled to a brake caliper 10 according to an exemplary embodiment of the present invention.

The brake caliper 10 includes: a housing in which a cylinder, a piston, and a brake pad are accommodated; a brake disk configured to receive torque of a drive shaft to be interlocked with the drive shaft; a caliper configured to include a receiver that is formed at an outer circumferential portion of the brake disk to partially receive an outer circumference thereof; a pair of brake pads respectively disposed at opposite inner sides of the receiver of the caliper to control rotation of the brake disk; and a piston mounted in the brake pads to be driven by a hydraulic pressure pipe line.

The brake caliper 10 is driven to push a piston disposed in a cylinder of the caliper 10 by the action of brake fluid by pressing a brake pedal, and then the piston allows the pair of pads disposed at opposite sides of the brake disk to move toward the brake disk so as to stop the rotating brake disk by friction braking.

The caliper cover 1 is coupled to this brake caliper 10 to protect the brake caliper 10 from the outside, and to prevent external foreign matter from flowing into the brake caliper 10.

Referring to FIG. 1 to FIG. 3, according to the exemplary embodiment of the present invention, the caliper cover 1 may include a cover plate 100, a bridge 210, and a fastening portion 230.

As used herein, an upper portion (upper side)/lower portion (lower side)/forward (front)/backward (rear) respectively indicate top/bottom/left/right in the drawing, and following descriptions will be made based on such directions.

The cover plate 100 may be formed to correspond to a shape of a front portion of the brake caliper 10 in order to cover the front portion of the brake caliper 10. Specifically, the cover plate 100 may include a body portion 110 for covering a flat surface of the front portion of the brake caliper 10 and a curved portion 130 for covering a curved surface of the brake caliper 10. In this case, the cover plate 100 formed to correspond to the front portion of the brake caliper 10 may be coupled to the brake caliper 10 so as to be in close contact with the front portion of the brake caliper 10, and a coupling method therefor will be described later.

When the caliper cover 1 is coupled to the brake caliper 10 to be in close contact therewith, it is possible to prevent noise and vibration caused by air flowing into a space between the caliper cover 1 and the brake caliper 10 when the vehicle is driven.

A pair of bridges 210 may be formed in the cover plate 100 so as to extend from the cover plate 100 toward a rear portion of the brake caliper 10.

Each of the bridges 210 has a predetermined length such that a first end thereof is coupled to the rear surface of the body portion 110 of the cover plate 100 and a second end thereof extends toward the rear portion of the brake caliper 10. A bent coupling portion 250 may be provided at the first end of the bridge 210, and may be welded to a rear surface of the body portion 110 of the cover plate 100 so as to couple the bridge 210 to the cover plate 100. When they are coupled by welding, the bridge 210 and the cover plate 100 may be provided integrally, so that rigidity of the caliper cover 1 may be increased.

However, the coupling method between the coupling portion 250 of the bridge 210 and the body portion 110 of the cover plate 100 is not limited to such a welding method. This may be performed by various coupling methods such as a bonding method using a bonding material and a mechanical coupling method using a fastening member such as a screw.

The bridges 210 may be formed to have a plate shape with a predetermined length to cross the brake caliper 10, and may be formed as a pair that are spaced apart from each other to correspond to a number of coupling grooves (not illustrated) formed in the brake caliper 10 to be described later.

The fastening portion 230 may be formed by bending substantially perpendicularly downward from the second end of each of the pair of bridges 210 to be fastened to the rear portion of the brake caliper 10. Specifically, the fastening portion 230 may be bent downward from the second end of the bridge 210, and may be bent in a plate form so as to face the body portion 110 of the cover plate 100.

Referring to FIG. 4 and FIG. 5, the fastening portion 230 is fastened to the rear portion of the brake caliper 10 to fix the caliper cover 1 to the brake caliper 10.

The caliper cover 1 may be in close contact with the brake caliper 10 to be fixed so as to not move forward/backward by allowing the cover plate 100 to be in contact with the brake caliper 10 and closely fastening the fastening portion 230 connected to the cover plate 100 by the bridge 210 to the rear portion of the brake caliper 10.

As such, the caliper cover 1 is rigidly fixed to the brake caliper 10, so that the caliper cover 1 is not separated from the brake caliper 10 by vibration or impact.

In addition, since the coupling between the brake caliper 10 and the caliper cover 1 is performed by the fastening portion 230 rather than a bonding material, there is no fear of the caliper cover 1 being separated from the brake caliper 10 due to heat generated when the vehicle is braked.

In this case, the fastening portion 230 may be fastened to the brake caliper 10 by screwing. Specifically, in the fastening portion 230, a fastening hole 270 is formed to correspond to a coupling groove (not illustrated) formed in the rear portion of the brake caliper 10, and a fixing bolt 290 may be inserted through the fastening hole 270 to be screwed into the coupling groove (not illustrated) to fasten the fastening portion 230 to the brake caliper 10.

A diameter of the coupling groove (not illustrated) formed in the brake caliper 10 and a diameter of the coupling hole 270 formed in the coupling portion 230 may be the same, and the fixing bolt 290 passing through the coupling hole 270 of the fastening portion 230 is screwed to the screw structure formed in the coupling groove so as to couple the fastening portion 230 to the brake caliper 10.

As such, the caliper cover 1 may be easily coupled to or separated from the brake caliper 10 of the vehicle by detachably coupling the caliper cover 1 to the brake caliper 10 through the fastening portion 230.

In addition, since a structure for coupling the caliper cover 1 to the brake caliper 10 is simply formed to include the bridge 210 and the fastening portion 230, the caliper cover 1 may be easily replaced within a limited space of the vehicle.

Meanwhile, according to the present exemplary embodiment, the caliper cover 1 may include a fixing portion 260.

The fixing portion 260 is bent from a side surface of each of the pair of bridges 210 to cover a side surface of the brake caliper 10 and to fix the bridge 210 to the brake caliper 10.

Referring to FIG. 1 and FIG. 2, the fixing portion 260 is formed to have a plate shape, and is bent substantially perpendicularly downward from the side surface of the bridge 210, and is formed in each of the pair of bridges 210 such that the fixing portions 260 face other. The pair of fixing portions 260 are fixedly attached to the respective side surfaces of the brake caliper 10 so that the caliper cover 1 is in close contact with the brake caliper 10 so as to not move left or right.

The caliper cover 1 may be fixed to the brake caliper 10 by the fixing portions 260, so as to reduce a stress applied to the fastening portion 230 by movement of the caliper cover 1.

As such, according to the present exemplary embodiment, the caliper cover 1 may be tightly coupled to the brake caliper 10 by the fastening portion 230 so as to not move forward or backward, and may be tightly coupled to the brake caliper 10 by the fixing portion 260 so as to not move left or right, thereby firmly fixing the caliper cover 1 to the brake caliper 10.

Meanwhile, the caliper cover 1 according to the present exemplary embodiment may further include a fixing protrusion 170 and a support 150.

The fixing protrusion 170 is formed at an upper portion of the cover plate 100 to guide a position where the caliper cover 1 is fixed to the brake caliper 10. Specifically, a fixing groove 15 may be formed on an upper surface of the brake caliper 10, and the fixing protrusion 170 corresponding to the fixing groove 15 may be formed at the upper side of the cover plate 100 to be positioned in the fixing groove 15, thereby confirming a coupled position of the caliper cover 1.

The support 150 protrudes toward the brake caliper 10 from a lower portion of the cover plate 100 to support a lower portion of the brake caliper 10 when the caliper cover 1 is fixed thereto.

When the fixing protrusion 170 and the support 150 are formed together in the cover plate 100, the caliper cover 1 is brought into close contact with the brake caliper 10 so as to not move up or down, by fixing the caliper cover 1 to the brake caliper 10 by the fixing protrusion 170 and the support 150 formed at upper and lower portions of the cover plate 100.

As such, according to the present exemplary embodiment, the caliper cover 1 may be tightly coupled to the brake caliper 10 by the fastening portion 230 so as to not move forward or backward, may be tightly coupled to the brake caliper 10 by the fixing portion 260 so as to not move left or right, and may be tightly coupled to the brake caliper 10 by the fixing protrusion 170 and the support 150 so as to not move up or down, thereby firmly fixing the caliper cover 1 to the brake caliper 10.

Accordingly, the caliper cover 1 is rigidly coupled to the brake caliper 10, so that the caliper cover 1 is not separated from the brake caliper 10 by vibration or impact.

In this case, the caliper cover 1 may include a metal, carbon steel, a carbon fiber, or the like for a heat dissipation effect of the caliper cover 1, weight reduction, and protection of the brake caliper 10.

A concave-convex portion 190 may be formed on an outer surface of the cover plate 100 of the caliper cover 1 according to the present exemplary embodiment.

The cover plate 100, the bridge 210, and the fastening portion 230 may be formed of an aluminum material.

Heat is generated in the brake caliper 10 due to friction between a road surface and tires, friction between a brake pad and a disk brake, and the like when a vehicle is driven. Particularly, rapid braking of the vehicle may cause high-temperature heat of about 800° C. in the disk brake, and such heat may be transferred to the brake caliper 10.

In the present exemplary embodiment, heat generated in the brake caliper 10 may be discharged using the caliper cover 1.

Specifically, according to the present exemplary embodiment, the caliper cover 1 may be tightly coupled to the brake caliper 10, and the cover plate 100, the bridge 210, and the fastening portion 230 of the caliper cover 1 may be formed of an aluminum material having high thermal conductivity to dissipate heat generated in the brake caliper 10 to the atmosphere through the caliper cover 1 formed of the aluminum material, thereby preventing the brake caliper 10 from being overheated.

The caliper cover 1 according to the present exemplary embodiment includes the concave-convex portion 190 protruding from the outer surface of the cover plate 100 to increase a contact area of the cover plate 100, which is in contact with outside air. Therefore, according to the present exemplary embodiment, the caliper cover 1 may improve the heat dissipation efficiency of the caliper cover 1 by increasing the contact area between the cover plate 100 and the outside air.

Thus, in the present exemplary embodiment, the brake caliper 10 may be prevented from overheating through the caliper cover 1, thereby preventing a problem of degradation of braking performance due to overheating of the brake caliper 10.

While the present invention has been particularly shown and described with reference to specific embodiments thereof, it will be understood by those skilled in the art that various changes in form and detail may be made therein without departing from the spirit and scope of the invention as defined by the following claims.

DESCRIPTION OF SYMBOLS

1: caliper cover 10: brake caliper
15: fixing groove 100: cover plate
110: body portion 130: curved portion
150: support 170: fixing protrusion
190: concave-convex 210: bridge
230: fastening portion 250: coupling portion
260: fixing portion 270: fastening hole
290: fixing bolt

What is claimed is:
1. A caliper cover that is coupled to a brake caliper to protect the brake caliper, the caliper cover comprising:

a cover plate configured to cover a front portion of the brake caliper;

a pair of bridges configured to extend from the cover plate toward a rear portion of the brake caliper; and a fastening portion formed to be bent from an end of each of the pair of bridges and to be fastened to the rear portion of the brake caliper, wherein the fastening portion is fastened to the brake caliper by screw coupling, the fastening portion is formed with a fastening hole corresponding to a coupling groove formed in the rear portion of the brake caliper, and a fixing bolt is screwed into the coupling groove through the fastening hole, to fasten the fastening portion to the brake caliper.

2. The caliper cover of claim 1, wherein the pair of the bridges are welded to and joined to the cover plate.

3. The caliper cover of claim 1, further comprising a fixing portion formed to be bent from a side surface of each of the pair of the bridges, for covering the side surface of the brake caliper and fixing the bridge to the brake caliper.

4. The caliper cover of claim 1, wherein a fixing groove is formed in an upper portion of the brake caliper, and a fixing protrusion is formed at upper side of the cover plate so as to correspond to the fixing groove.

5. The caliper cover of claim 1, further comprising a support configured to support a lower portion of the brake caliper at a lower side of the cover plate.

6. The caliper cover of claim 1, wherein the cover plate, the bridge, and the fastening portion are formed of an aluminum material.

7. The caliper cover of claim 1, wherein on an outer surface of the cover plate, a concave-convex portion for dissipating heat is formed.

* * * * *